United States Patent [19]

Ness

[11] Patent Number: 5,139,177
[45] Date of Patent: Aug. 18, 1992

[54] UTENSIL TO REMOVE CONTENTS OF NARROW NECKED BOTTLES

[75] Inventor: Gerald C. Ness, Eagan, Minn.

[73] Assignee: Ness Feress, Inc., Coon Rapids, Minn.

[21] Appl. No.: 667,869

[22] Filed: Mar. 12, 1991

[51] Int. Cl.$^5$ .............................................. A47G 19/30
[52] U.S. Cl. ................................... 222/322; 222/342; 15/245
[58] Field of Search ............... 222/149, 151, 322, 342, 222/357, 386, 387, 392, 393, 405, 408.5, 409, 501; 15/245

[56] References Cited

U.S. PATENT DOCUMENTS

| | | | |
|---|---|---|---|
| 2,036,549 | 4/1936 | Smith | 222/322 |
| 2,563,251 | 8/1951 | Lanahan | 222/322 |
| 2,828,502 | 4/1958 | Tupper | 15/245 |
| 2,830,731 | 4/1958 | Munao | 222/322 |
| 4,311,257 | 1/1982 | Grieco et al. | 222/387 |
| 4,321,724 | 3/1982 | Samuels | 15/245 |
| 4,380,840 | 4/1983 | Rieckenberg | 15/245 X |
| 4,422,206 | 12/1983 | Bruce et al. | 15/245 X |

Primary Examiner—Michael S. Huppert
Assistant Examiner—Anthoula Pomrening
Attorney, Agent, or Firm—Leo Gregory

[57] ABSTRACT

A bottle dispensing utensil having a long handle having a divided blade at one end thereof disposed in a plane normal to the axis of the handle, the blade being retractable in being disposed through a fairly narrow bottleneck and being sufficiently resilient to resume its normal span and being sufficiently rigid to dispense from a bottle materials of such viscosity as catsup and salad dressings.

5 Claims, 1 Drawing Sheet

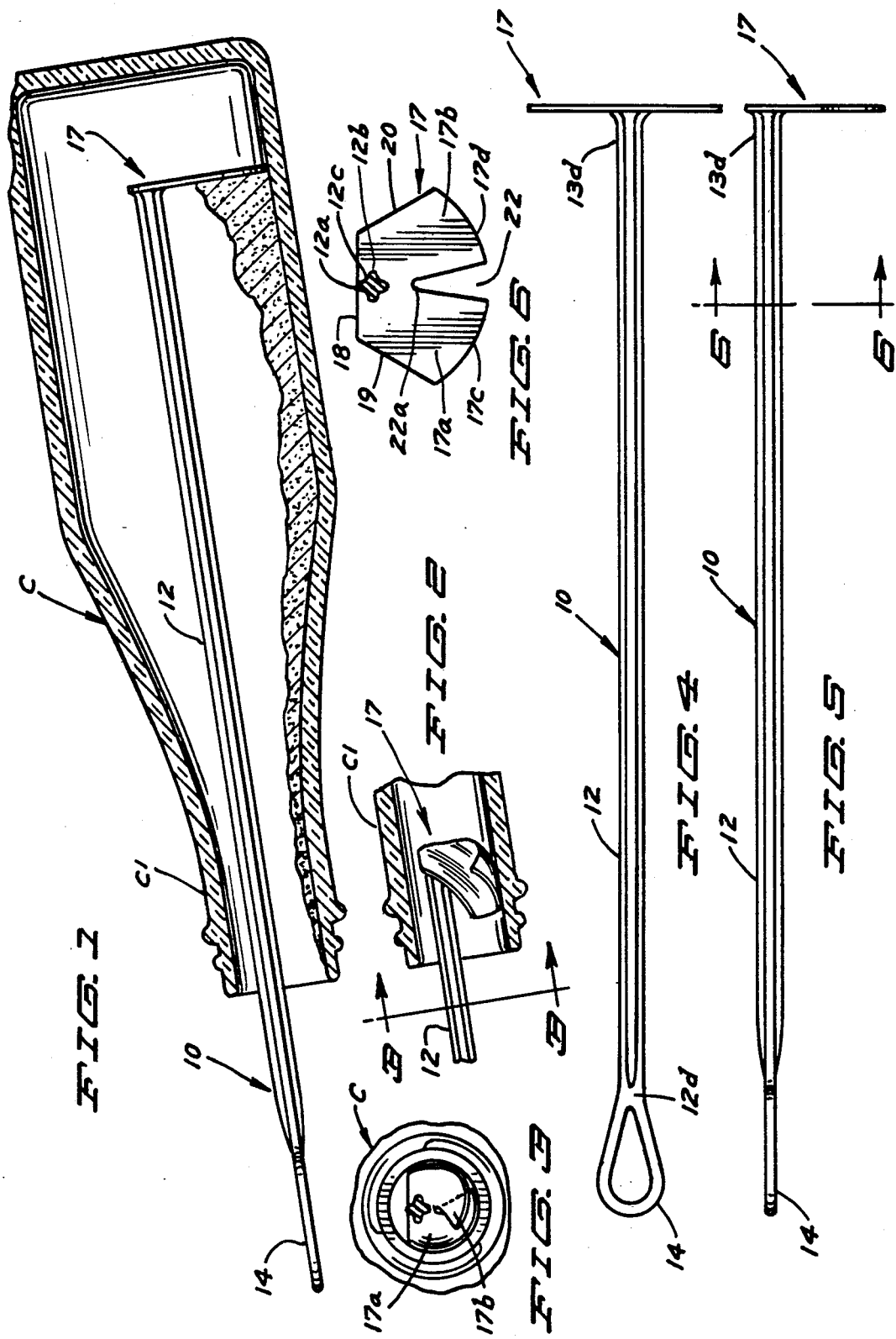

UTENSIL TO REMOVE CONTENTS OF NARROW NECKED BOTTLES

BACKGROUND OF THE INVENTION

1. Field of Invention

This invention relates to a dispensing device to discharge somewhat viscous type materials from narrow necked bottles.

2. Description of the Previous Art

Bottled materials such as catsup and many salad dressings come in narrow necked bottles which require a jerky bottle motion for their discharge and the discharge is practically uncontrollable. There are also other viscous type food materials used about the home such as for cooking purposes which come in narrow necked bottles for which a practical type dispenser would be a great convenience in order to have controlled withdrawals therefrom.

Known of is a liquid dispensing device to empty a narrow necked bottle, the device having a stem having pivoted thereto a spring actuated scoop as disclosed in U.S. Pat. No. 1,409,472 to C. A. Rohder.

However it is desirable to have for use a single piece structure particularly adapted for dispensing purposes through narrow necked bottles which structure would be very easy to operate and very easy to maintain in a clean condition.

SUMMARY OF THE INVENTION

This invention relates to a device particularly adapted to be disposable into a narrow necked bottle for the controlled removal of contents therefrom.

More particularly the invention herein relates to a device having a relatively long handle of small transverse dimension and having at one end thereof disposed in a plane substantially normal to the axis of said handle a split blade having two portions having a V-shaped separation centrally thereof, having an outer configuration compatible with the cross sectional configuration of a bottle and having the portions of said blade yield to overlap to reduce in width in passing through the neck of a bottle and resuming their normal span upon entering into the body portion of a bottle. A withdrawal movement of said device discharges the contents of the bottle in accordance with the extent of such movement.

Thus the device herein provides significant convenience in operation.

DESCRIPTION OF THE DRAWINGS

FIG. 1 is a view in longitudinal vertical section of a container showing the device herein in side elevation in an operating position;

FIG. 2 is a broken view of a neck portion of a container in longitudinal vertical section showing a head portion of the device herein in a retracted position;

FIG. 3 is a view in vertical section taken on line 3—3 of FIG. 2 as illustrated;

FIG. 4 is a view in front elevation of the device herein;

FIG. 5 is a view in one side elevation of the device herein; and

FIG. 6 is a view taken in vertical section on line 6—6 of FIG. 5 showing the dispensing end portion of the device in elevation.

DESCRIPTION OF A PREFERRED EMBODIMENT

Referring to the drawings, as shown in FIG. 1, the device herein is indicated generally by the reference numeral 10 and comprises an elongated handle 12 which preferably will be on the order of nine to ten inches in length and having a small cross sectional dimension. The handle is readily extruded of a plastic material being somewhat bendable.

FIG. 3 showing a cross sectional of the handle 12 indicates that the handle is ribbed longitudinally as at 12a and 12b having concave connections therebetween as represented by 12c. Thus a good gripping holding surface is formed.

A loop 14 is formed at one end of said handle and is shown to be continuous therewith as at 12d. The adjacent ends of the ribs are tapered or beveled to blend smoothly into said loop.

At the end opposite said loop or the lower end 13d of said handle, a blade 17 is attached. Said blade is disposed to be in a plane that is normal to the axis of said handle.

As here shown, said blade has a flat back edge 18 and outwardly flaring side edges 19 and 20. Intermediate said blade dividing the same into portions 17a and 17b is a V-shaped recess or separation 22 having a radius or being rounded at its bottom as at 22a. The top edges 17c and 17d of said blade portions 17a and 17b are curved to be generally compatible with the cross sectional curvature of the body portion of a container C such as of catsup or of a salad dressing.

At the juncture of said blade 17 and the adjacent end 13d of said handle, for reinforcement, a fillet or collar 21 is formed to blend smoothly into the adjacent surface portions.

In operation, when the blade 17 is inserted into the neck C1 as of a catsup bottle C, the blade portions 17a and 17b yield responsive to the narrow spacing of bottleneck and partially overlap one another over the recess or separation 22 as indicated in FIG. 3, until the blade is moved into the lower portion of the bottle wherein said blade portions spread out to resume their normal span. The blade is made of a sufficiently rigid plastic material whereby it provides for a ready withdrawal or discharge of such food material as catsup and various salad dressings upon being moved outwardly of the bottle and yet the portions of said blade yield sufficiently to overlap and flex in passing through the neck of a bottle.

Said device is unitary in construction, very simple in design, it functions very satisfactorily and is readily kept clean.

It will of course be understood that various changes may be made in form, details, arrangement and proportions of the product without departing from the scope of the invention which, generally stated, consists in a product capable of carrying out the objects above set forth, in the parts and combination of parts disclosed and defined in the appended claims.

What is claimed is:

1. A device for the controlled dispensing of a viscous type of material from a narrow necked bottle, having in combination
    an elongated handle of small cross section dimension,
    a blade secured to one end of said handle,
    said blade being disposed in a plane at right angles to the axis of said handle, a radial intermediate recess separating a part of said blade into two portions, said portions of said blade having a span wider than the width of a neck of a narrow necked bottle, said blade portions yielding by partially overlapping each other in being passed through the neck of said bottle, and said blade portions resuming their normal span upon entering into the widened bottom portion of said bottle.

2. A device for the controlled dispensing of a viscous type of material from a narrow necked bottle, having in combination an elongated handle of a small cross sectional dimension, a blade secured to one end of said handle, said blade being disposed in a plane at right angles to the axis of said handle, said blade having a straight edged bottom, outwardly flared side edges and a curved top edge portion, said curvature being compatible with the cross sectional curvature of the bottom enlarged portion of a narrow necked bottle, a radial V-shaped recess separating a part of said blade into two portions, and said portions having such flexibility as to overlap to reduce in width in being passed through the narrow neck of a bottle.

3. The structure of claim 2, wherein said V-shaped recess has a radius at its bottom.

4. The structure of claim 2, wherein said handle has a loop formed at its end opposite the end to which said blade is attached.

5. The structure of claim 2, wherein said handle has a plurality of ribs formed longitudinally thereabout.

* * * * *